(12) United States Patent
Taylor

(10) Patent No.: US 9,481,790 B2
(45) Date of Patent: Nov. 1, 2016

(54) MARINE FOAM

(71) Applicant: Fomo Products, Inc., Norton, OH (US)

(72) Inventor: Anthony J. Taylor, Medina, OH (US)

(73) Assignee: ICP Adhesives and Sealants, Inc., Norton, OH (US)

( * ) Notice: Subject to any disclaimer, the term of this patent is extended or adjusted under 35 U.S.C. 154(b) by 0 days.

(21) Appl. No.: 14/737,879

(22) Filed: Jun. 12, 2015

(65) Prior Publication Data

US 2015/0274967 A1     Oct. 1, 2015

Related U.S. Application Data

(63) Continuation-in-part of application No. 13/646,785, filed on Oct. 8, 2012, now Pat. No. 9,062,168.

(51) Int. Cl.

| | |
|---|---|
| C08G 18/48 | (2006.01) |
| C08L 75/04 | (2006.01) |
| C08G 18/34 | (2006.01) |
| C08L 83/06 | (2006.01) |
| C08J 9/14 | (2006.01) |
| C08G 18/40 | (2006.01) |
| C08G 18/50 | (2006.01) |
| C08K 5/00 | (2006.01) |
| C08G 18/09 | (2006.01) |
| C08G 18/16 | (2006.01) |
| C08G 18/18 | (2006.01) |
| C08G 18/20 | (2006.01) |
| C08G 18/22 | (2006.01) |
| C08G 18/24 | (2006.01) |
| C08G 18/38 | (2006.01) |
| C08G 18/42 | (2006.01) |
| C08G 101/00 | (2006.01) |
| E04B 2/02 | (2006.01) |

(52) U.S. Cl.
CPC .............. *C08L 75/04* (2013.01); *C08G 18/092* (2013.01); *C08G 18/163* (2013.01); *C08G 18/165* (2013.01); *C08G 18/1808* (2013.01); *C08G 18/2081* (2013.01); *C08G 18/225* (2013.01); *C08G 18/242* (2013.01); *C08G 18/341* (2013.01); *C08G 18/3806* (2013.01); *C08G 18/4018* (2013.01); *C08G 18/4211* (2013.01); *C08G 18/4213* (2013.01); *C08G 18/482* (2013.01); *C08G 18/4829* (2013.01); *C08G 18/5021* (2013.01); *C08J 9/144* (2013.01); *C08J 9/146* (2013.01); *C08K 5/0066* (2013.01); *C08L 83/06* (2013.01); *C08G 2101/005* (2013.01); *C08G 2101/0025* (2013.01); *C08G 2105/02* (2013.01); *C08J 2201/022* (2013.01); *C08J 2203/142* (2013.01); *C08J 2203/162* (2013.01); *C08J 2203/18* (2013.01); *C08J 2375/04* (2013.01); *E04B 2002/0293* (2013.01)

(58) Field of Classification Search
CPC ............ C08G 18/4018; C08G 18/482; C08G 18/341; C08G 2101/0025; C08G 2105/02; C08J 2201/022; C08J 2201/0025; C08J 2203/142; C08J 2203/162; C08J 2203/18; C08J 2375/04; C08J 9/144; C08J 9/146; E04B 2002/0293; C08L 75/04; C08L 83/06
See application file for complete search history.

(56) References Cited

U.S. PATENT DOCUMENTS

| | | | |
|---|---|---|---|
| 5,488,072 A * | 1/1996 | Green ................. | C08G 18/482 521/129 |
| 6,534,556 B2 | 3/2003 | Lacarte et al. | |
| 7,705,063 B2 | 4/2010 | Janzen et al. | |
| 8,680,168 B2 | 3/2014 | Fishback et al. | |
| 2003/0114549 A1* | 6/2003 | Kalinowski ........ | C08G 18/4018 521/99 |
| 2005/0043423 A1 | 2/2005 | Schmidt et al. | |
| 2010/0280141 A1* | 11/2010 | Loh .................... | C08G 18/4883 521/155 |

FOREIGN PATENT DOCUMENTS

WO      2009055436 A1    4/2009

* cited by examiner

*Primary Examiner* — John Cooney
(74) *Attorney, Agent, or Firm* — Hahn Loeser & Parks LLP

(57) ABSTRACT

The invention generally pertains to the use of polyurethane foam blown by at least one blowing agent having a boiling point at atmospheric pressure of between ~5° C. to ~50° C., including miscible blends thereof, which passes all United States Coast Guard Title 33, Part 183 specifications wherein the buoyant force of the froth polyurethane or polyisocyanurate foam is not reduced more than 5% after exposure to being immersed in a fully saturated gasoline vapor atmosphere, in reference fuel B, in reference oil No. 2, and in a 5% solution of $Na_3PO_4$.

34 Claims, No Drawings

MARINE FOAM

CROSS-REFERENCE TO RELATED APPLICATIONS

This application claims priority to and is a continuation-in-part application to U.S. patent application Ser. No. 13/646,785 filed on 8 Oct. 2012, the contents of which are hereinby fully incorporated by reference.

TECHNICAL FIELD

The invention described herein pertains generally to a composition and a method involving the use of polyurethane or polyisocyanurate foam blown by a blowing agent having a boiling point at atmospheric pressure of between ~5° C. to ~50° C., which passes all United States Coast Guard Title 33, Part 183 specifications wherein the buoyant force of the froth polyurethane or polyisocyanurate foam is not reduced more than 5% after exposure to being immersed in a fully saturated gasoline vapor atmosphere at an elevated temperature, as well as being tested at room temperature in reference fuel B, in reference oil No. 2, and in a 5% solution of $Na_3PO_4$ for defined periods of time.

BACKGROUND OF THE INVENTION

United States Coast Guard Title 33, Part 183 specifications are difficult to meet with existing polyurethane or polyisocyanurate foams when it comes to buoyancy after exposure to fully saturated gasoline vapor atmosphere, in reference fuel B, in reference oil No. 2, and in a 5% solution of $Na_3PO_4$.

Without being held to any one theory or mode of operation, it is believed that at least part of the issue focuses on the need to increase the thermal, hydrolytic and chemical stability of the foam, necessitating an increase in the phthalic anhydride containing polyols and a decrease in (or elimination of) the sucrose polyester polyol which is typically present in many foams so as to enable the foam to meet the ASTM E-84 test standards regarding the surface burning characteristics of building materials.

SUMMARY OF THE INVENTION

In accordance with one aspect of the present invention, there is provided a frothable foam which a polyurethane or polyisocyanurate foam is blown by at least one HFC blowing agent having a boiling point at atmospheric pressure of between ~5° C. to ~50° C., including miscible blends thereof, which passes all United States Coast Guard Title 33, Part 183 specifications wherein the buoyant force of the foam is not reduced more than 5% after exposure to each of the following conditions, namely:

being immersed in a fully saturated gasoline vapor atmosphere for 30 days at a minimum temperature of 38° C.;
being immersed for 24 hours at 23° C. plus or minus 2° C. in reference fuel B;
being immersed for 30 days at 23° C. plus or minus 2° C. in reference fuel B;
being immersed for 24 hours at 23° C. plus or minus 2° C. in reference oil No. 2;
being immersed for 30 days at 23° C. plus or minus 2° C. in reference oil No. 2;
being immersed for 24 hours at 23° C. plus or minus 2° C. in a 5% solution of $Na_3PO_4$; and
being immersed for 30 days at 23° C. plus or minus 2° C. in a 5% solution of $Na_3PO_4$.

The polyurethane or polyisocyanurate foam comprises:
35-75 wt. % of a polyol blend which comprises:
  25-45 wt. % of at least one polyether polyol in the polyol blend present in a major amount;
  10-30 wt. % of at least one phthalic anhydride based aromatic polyester polyol present in a minor amount in the polyol blend, the at least one phthalic anhydride based aromatic polyester polyol comprising at least 35% of the polyol blend;
30-65 wt. % of at least one other additive comprising at least one plasticizer and at least one flame retardant
1-5 wt. % of at least one surfactant;
1-5 wt. % of at least one catalyst;
0.5-3 wt. % of water; and
the weight percentages combining to total 100%.

In a generic sense, the at least one phthalic anhydride based aromatic polyester polyol is

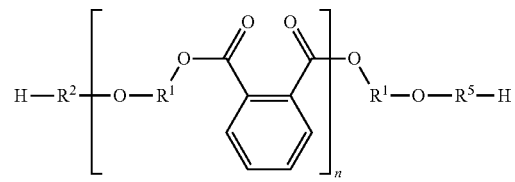

wherein
$R^1$ is selected from the group consisting of an alkylene group of from 2 to 10 carbon atoms, $-CH_2-R^3-CH_2-$, and $-(R^4O)_m-R^4-$;
$R^2$ and $R^5$ are independently $-[CH_2CH_2O]_x-$, $[CH_2CH(CH_3)O]_x-$, $-[CH_2CH_2CH(CH_3)O]_x-$, or a random combination thereof;
$R^3$ is selected from the group consisting of

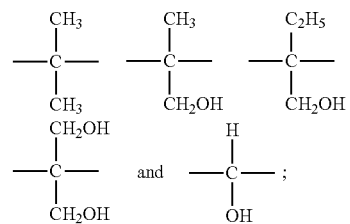

each $R^4$ is independently an alkylene group of from 2 to 4 carbon atoms; and
x, m, and n are independently from 1-200.

In a more preferred embodiment, the at least one phthalic anhydride based aromatic polyester polyol preferably is

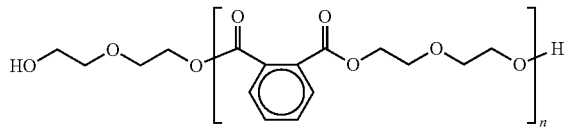

and further wherein
an hydroxyl number in mg KOH/g is between 230-250 inclusive;
a viscosity value at 25° C. is between 2,000-4,500 cP inclusive;

an equivalent average weight is approximately 234; and
an average molecular weight is approximately 468.
The at least one polyether polyol preferably is

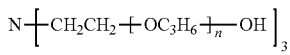

and further wherein
an hydroxyl number in mg KOH/g is approximately 600;
a viscosity value at 25° C. is approximately 380 cP; and
an average molecular weight is approximately 280.
The at least one other additive preferably is selected from the group comprising

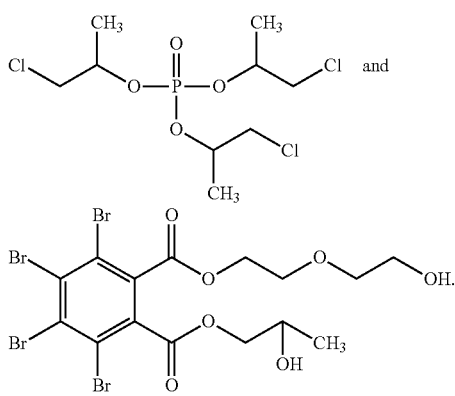

The at least one catalyst preferably is at least two catalysts

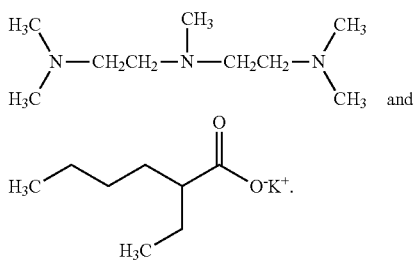

The water is added in an amount of approximately 1% by weight and preferably the at least one HFC blowing agent has a boiling point at atmospheric pressure of between ~10° C. to ~40° C. The at least one HFC blowing agent is typically 1,1,1,3,3-pentafluoropropane, optionally combined with a second blowing agent.

A process to achieve the above is also described involving the synthesizing a polyurethane or polyisocyanurate foam blown by at least one HFC blowing agent having a boiling point at atmospheric pressure of between ~5° C. to ~50° C., which passes all United States Coast Guard Title 33, Part 183 specifications.

In accordance with another aspect of the present invention, there is provided a frothable foam which a polyurethane or polyisocyanurate foam is blown by at least one HFO blowing agent having a boiling point at atmospheric pressure of between ~5° C. to ~50° C., including miscible blends thereof, which passes all United States Coast Guard Title 33, Part 183 specifications wherein the buoyant force of the foam is not reduced more than 5% after exposure to each of the following conditions, namely:
being immersed in a fully saturated gasoline vapor atmosphere for 30 days at a minimum temperature of 38° C.;
being immersed for 24 hours at 23° C. plus or minus 2° C. in reference fuel B;
being immersed for 30 days at 23° C. plus or minus 2° C. in reference fuel B;
being immersed for 24 hours at 23° C. plus or minus 2° C. in reference oil No. 2;
being immersed for 30 days at 23° C. plus or minus 2° C. in reference oil No. 2;
being immersed for 24 hours at 23° C. plus or minus 2° C. in a 5% solution of $Na_3PO_4$; and
being immersed for 30 days at 23° C. plus or minus 2° C. in a 5% solution of $Na_3PO_4$.

The polyurethane or polyisocyanurate foam comprises:
35-75 wt. % of a polyol blend which comprises:
25-45 wt. % of at least one polyether polyol in the polyol blend present in a major amount;
10-30 wt. % of at least one phthalic anhydride based aromatic polyester polyol present in a minor amount in the polyol blend, the at least one phthalic anhydride based aromatic polyester polyol comprising at least 35% of the polyol blend;
30-65 wt. % of at least one other additive comprising at least one plasticizer and at least one flame retardant;
1-5 wt. % of at least one surfactant;
1-5 wt. % of at least two catalysts, at least one of which is tin-based;
essentially no water; and
the weight percentages combining to total 100%.

In a generic sense, the at least one phthalic anhydride based aromatic polyester polyol is

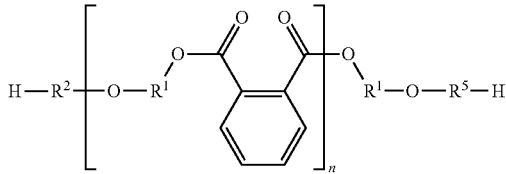

wherein
$R^1$ is selected from the group consisting of an alkylene group of from 2 to 10 carbon atoms, $-CH_2-R^3-CH_2-$, and $-(R^4O)_m-R^4-$;
$R^2$ and $R^5$ are independently $-[CH_2CH_2O]_x-$, $[CH_2CH(CH_3)O]_x-$, $-[CH_2CH_2CH(CH_3)O]_x-$, or a random combination thereof;
$R^3$ is selected from the group consisting of

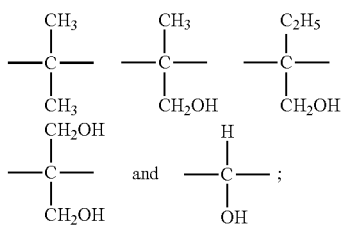

each $R^4$ is independently an alkylene group of from 2 to 4 carbon atoms; and
x, m, and n are independently from 1-200.

In a more preferred embodiment the at least one phthalic anhydride based aromatic polyester polyol preferably is

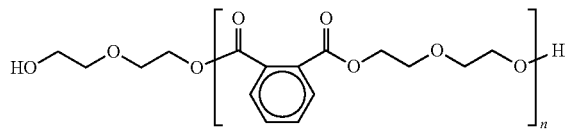

and further wherein
an hydroxyl number in mg KOH/g is between 230-250 inclusive;
a viscosity value at 25° C. is between 2,000-4,500 cP inclusive;
an equivalent average weight is approximately 234; and
an average molecular weight is approximately 468.

The at least one polyether polyol preferably is

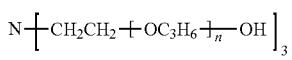

and further wherein
an hydroxyl number in mg KOH/g is approximately 600;
a viscosity value at 25° C. is approximately 380 cP; and
an average molecular weight is approximately 280.

The at least one other additive is preferably selected from the group comprising

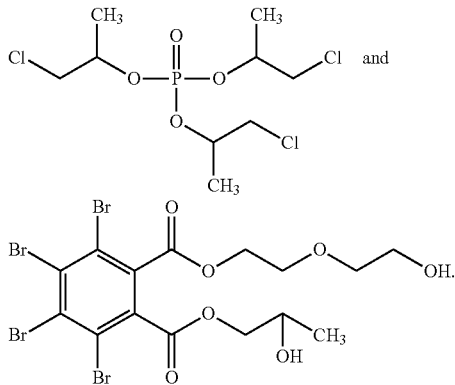

The at least two catalysts comprise

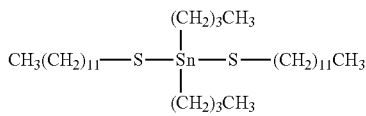

and at least one of

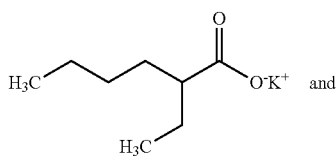

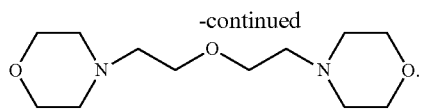

The at least one HFO blowing agent preferably has a boiling point at atmospheric pressure of between ~10° C. to ~40° C. and is 1,1,1,4,4,4 hexafluoro-2-butene, optionally combined with a second blowing agent.

A process to achieve the above is also described involving the synthesizing a polyurethane or polyisocyanurate foam blown by at least one HFO blowing agent having a boiling point at atmospheric pressure of between ~5° C. to ~50° C., which passes all United States Coast Guard Title 33, Part 183 specifications.

The above and other aspects of the invention are achieved by using low pressure, high boiling point blowing agents, either neat or as a miscible blend or azeotrope with other blowing agents, recognizing that the invention encompasses future blowing agents having characteristics defined herein, particularly higher boiling points.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The invention relates to improved polyurethane and polyisocyanurate foams, which employ at least an effective amount of a low pressure, higher boiling point blowing agent(s) including miscible blends thereof.

As used in this application, a non-limiting exemplary definition for the term "polyurethane" or "PUR", which includes mixtures of polyurethanes, means a class of reaction polymers in which a urethane linkage is produced by reacting an isocyanate group, —N=C=O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_{n \geq 2}$ and a polyol is a molecule with two or more hydroxyl functional groups, R'—(OH)$_{n \geq 2}$. The reaction product is a polymer containing the urethane linkage, —RNHCOOR'—. Isocyanates will react with any molecule that contains an active hydrogen. Importantly, isocyanates react with water to form a urea linkage and carbon dioxide gas. Commercially, polyurethanes are produced by reacting a liquid isocyanate with a liquid blend of polyols, catalyst, and other additives. The isocyanate is commonly referred to in North America as the "A-side" or just the "iso". The blend of polyols and other additives is commonly referred to as the "B-side" or as the "poly". In Europe the definitions for the contents of the "A" and "B" compositions are reversed.

As used in this application, a non-limiting exemplary definition for the term "isocyanate", which includes mixtures of isocyanates, means a moiety which contains an —N=C=O arrangement of chemical elements. Molecules that contain two isocyanate groups are called diisocyanates.

Isocyanates can be classed as aromatic, such as diphenylmethane diisocyanate ("MDI") or toluene diisocyanate ("TDI"); or aliphatic, such as hexamethylene diisocyanate ("HDI"). An example of a polymeric isocyanate is polymeric diphenylmethane diisocyanate, which is a blend of molecules with two-, three-, and four- or more isocyanate groups, with an average functionality of 2.7. Isocyanates can be further modified by partially reacting them with a polyol to form a prepolymer. Important characteristics of isocyanates are their molecular backbone, % —N═C═O content, functionality, and viscosity. Any organic polyisocyanate can be employed in the polyurethane or polyisocyanurate foam synthesis inclusive of aliphatic and aromatic polyisocyanates. Suitable organic polyisocyanates include aliphatic, cycloaliphatic, arylaliphatic, aromatic, and heterocyclic isocyanates which are well known in the field of polyurethane chemistry. Representative organic polyisocyanates correspond to the formula:

wherein R is a polyvalent organic radical which is either aliphatic, arylalkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

As used in this application, a non-limiting exemplary definition for the term "polyol", which includes mixtures of polyols, can be any polyol which reacts in a known fashion with an isocyanate in preparing a polyurethane or polyisocyanurate foam. In one sense, polyol means a moiety which contains more than one hydroxyl group. Molecules that contain two hydroxyl groups are called diols, those with three hydroxyl groups are called triols, et cetera. Polyols are polymers in their own right. They are formed by base-catalyzed addition of propylene oxide ("PO"), ethylene oxide ("EO") onto a hydroxyl or amine containing initiator, or by polyesterification of a di-acid, such as adipic acid, with glycols, such as ethylene glycol ("EG") or dipropylene glycol ("DPG"). Polyols extended with PO or EO are polyether polyols. Polyols formed by polyesterification are polyester polyols. The choice of initiator, extender, and molecular weight of the polyol greatly affect its physical state, and the physical properties of the polyurethane polymer. Important characteristics of polyols are their molecular backbone, initiator, molecular weight, % primary hydroxyl groups, functionality, and viscosity. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; polyols derived from natural products (e.g. soy beans), glycerol; ethylene glycol; diethylene glycol; propylene glycol; graft copolymers of polyether polyols with a vinyl polymer; a copolymer of a polyether polyol with a polyurea; one or more of (a) condensed with one or more of (b) as illustrated by (a) glycerine, ethylene glycol, diethylene glycol, trimethylolpropane, ethylene diamine, pentaerythritol, soy oil, lecithin, tall oil, palm oil, castor oil; and (b) ethylene oxide, propylene oxide, a mixture of ethylene oxide and propylene oxide; or combinations thereof.

As used in this application, the Poly-G 37-600 polyether polyol will mean and have the following characteristics.

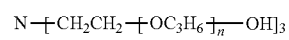

Hydroxyl Number, mg KOH/g 600
Water, % by wt., max. 0.08
Viscosity at 77° F. (25° C.), cP 380
Molecular Weight (average) 280
Specific Gravity at 77° F. (25° C.), 1.051

As used in this application, one of the preferred phthalic anhydride based polyester polyols is and has the following physical characteristics.

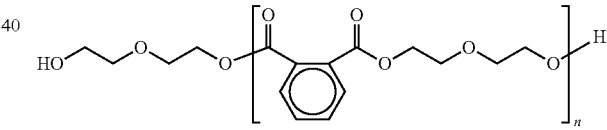

Hydroxyl Number, 230-250 (mg KOH/g)
Water, max. 0.15% by wt.
Acid Number, max. 0.6-1.0 mg KOH/g
Viscosity at 77° F. (25° C.), 2,000-4,500 cP
Equivalent Weight (average) 234
Molecular Weight (average) 468
Color, Gardner 4
Specific Gravity @ 25° C., 1.19

As used in this application, the terephthalic anhydride based polyester polyol will mean and having the following characteristics.

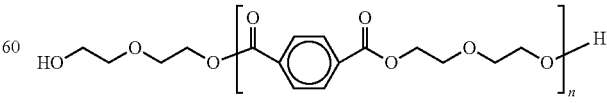

Hydroxyl Number, 335-365 (mg KOH/g)
Water, max. 0.15% by wt.
Acid No. 0.5-2.0 mg KOH/g
Viscosity @ 25° C. 2500-3500 cP Specific Gravity @ 25° C., 1.233
Functionality 2.20
Equivalent Weight 160.3

As used in this application, a more generic non-limiting exemplary definition for the term phthalic anhydride based polyester polyol is

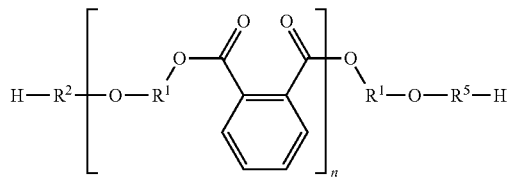

wherein
$R^1$ is selected from the group consisting of an alkylene group of from 2 to 10 carbon atoms, —$CH_2$—$R^3$—$CH_2$—, and —$(R^4O)_m$—$R^4$—;
$R^2$ and $R^5$ are independently —$[CH_2CH_2O]_x$—, —$[CH_2CH(CH_3)O]_x$—, —$[CH_2CH_2CH(CH_3)O]_x$—, or a random combination thereof;
$R^3$ is selected from the group consisting of

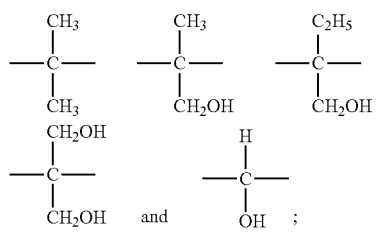

each $R^4$ is independently an alkylene group of from 2 to 4 carbon atoms; and
x, m, and n are independently from 1-200.

As used in this application, a non-limiting exemplary definition for the term "polyol premix", which includes mixtures of polyol premixes, means a polyol premix which includes a catalyst. Useful catalysts are primary amines, secondary amines or most typical tertiary amines. Useful tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-α-phenylethyl)amine; or combinations thereof. Useful primary amine catalysts non-exclusively include: triphenylmethylamine and 1,1-diethyl-n-propylamine. Other useful amines include morpholines, imidazoles, ether containing compounds, and the like. These include dimorpholinodiethylether; N-ethylmorpholine; N-methylmorpholine; bis(dimethylaminoethyl)ether; imidazole; n-methylimidazole; 1,2-dimethylimidazol; dimorpholinodimethylether; N,N,N',N',N'',N''-pentamethyldiethylenetriamine; N,N,N',N',N'',N''-pentaethyldiethylenetriamine; N,N,N',N',N'',N''-pentamethyldipropylenetriamine; bis(diethylaminoethyl)ether; and bis(dimethylaminopropyl)ether. The polyol premix composition may contain an optional silicone surfactant.

The silicone surfactant is used to form a foam from the mixture, as well as to control surface tension that impacts the size of the bubbles of the foam so that a foam of a desired open or closed cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise. The polyol premix composition may optionally contain a non-silicone surfactant, such as a non-silicone, non-ionic surfactant. These may include oxyethylated alkylphenols, oxyethylated fatty alcohols, paraffin oils, castor oil esters, ricinoleic acid esters, turkey red oil, groundnut oil, paraffins and fatty alcohols. A preferred non-silicone surfactant is LK-443 which is commercially available from Air Products Corporation.

As used in this application, a non-limiting exemplary definition for the term "polyisocyanurate" or "PIR", which includes mixtures of polyisocyanurates, means the reaction the reaction product of MDI and a polyol, which typically takes place at higher temperatures compared to the reaction temperature for the manufacture of PUR. Without being limited to any theory of operation or synthesis, at these elevated temperatures and in the presence of specific catalysts, MDI will first react with itself, producing a stiff, ring molecule, which is a reactive intermediate (a tri-isocyanate isocyanurate compound). Remaining MDI and the tri-isocyanate react with polyol to form a complex poly(urethane-isocyanurate) polymer, which is foamed in the presence of a suitable blowing agent. This isocyanurate polymer has a relatively strong molecular structure, because of the combination of strong chemical bonds, the ring structure of isocyanurate and high cross link density, each contributing to the greater stiffness than found in comparable polyurethanes. The greater bond strength also means these are more difficult to break, and as a result a PIR foam is chemically and thermally more stable: breakdown of isocyanurate bonds is reported to start above 200° C., compared with urethane at 100 to 110° C. PIR typically has an MDI/polyol ratio, also called its index (based on isocyanate/polyol stoichiometry to produce urethane alone), of between 200 and 500. By comparison PUR indices are normally around 100. As the index increases material stiffness but also brittleness also increase, although the correlation is not linear. Depending on the product application greater stiffness, chemical and/or thermal stability may be desirable. As such PIR manufacturers offer multiple products with identical densities but different indices in an attempt to achieve optimal end use performance.

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1,3,3 pentafluoropentane or FEA-1100 (DuPont), namely 1,1,1,4,4,4 hexafluoro-2-butene.

It is often necessary or even desirable to mitigate the global warming potential ("GWP") of blowing agent, aerosol, or solvent compositions. As used herein, GWP is measured relative to that of carbon dioxide and over a 100 year time horizon, as defined in "The Scientific Assessment of Ozone Depletion, 2002, a report of the World Meteorological Association's Global Ozone Research and Monitoring Project." In certain preferred forms, the present compositions also preferably have an Ozone Depletion Potential ("ODP") of not greater than 0.05, more preferably not greater than 0.02 and even more preferably about zero. As used herein, "ODP" is as defined in "The Scientific Assessment of Ozone Depletion, 2002, A Report of the World Meteorological Association's Global Ozone Research and Monitoring Project."

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to: one or more additional components of hydrofluorocarbons, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), and cis- and trans-1,2,3,3-tetrafluoropropene (HFO-1234ye), HFC-1233zd, and HFC-1225ye. Preferred co-blowing agents non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141 b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term, "effective amount" means a quantity sufficient to improve the result of the foaming operation when compared to a control without the added low pressure blowing agent.

As used herein, a non-limiting definition for the term, "higher boiling point blowing agent" means a blowing agent having a boiling point at atmospheric pressure of between ~5° C. to ~50° C., more preferably ~10° C. to ~40° C.

As used herein, a non-limiting definition for the term "lower pressure blowing agent" means a blowing agent having a vapor pressure of between ~5 psig to ~30 psig at approximately room temperature, ~75° F. (equivalently ~34.5 kPa to ~206.9 kPa at approximately room temperature, ~24° C.).

As used herein, a non-limiting definition for the term "approximately" means a deviation from the stated end points of a range of 10%.

The polymerization reaction is catalyzed by tertiary amines, such as dimethylcyclohexylamine, and organometallic compounds, such as dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl)ether, or specifically drive the isocyanate trimerization reaction, such as potassium octoate.

At its simplest level, the distinction between PIR and PUR polymers is not large. The proportion of MDI is higher than for PUR and instead of a polyether polyol, a polyester derived polyol is used in the reaction. Catalysts and additives used in PIR formulations also differ from those used in PUR.

The foam of the invention dispenses from relatively inexpensive pressurized, but considered low-pressure (130-225 psi) cylinders rather than high pressure dispensing equipment (>1,000 psi as typically used in impingement mixing) of the prior art. The use of cylinder dispensed polyurethane foam does not have upfront capital costs for equipment as would be necessary with high pressure dispensed polyurethane foam, which is in the order of $30,000 to $100,000 for the special handling equipment required, including proportioning units and spray guns.

Example #1

A typical polyurethane foam was made in by combining two polyether polyols, e.g., poly-G 37-600 and Voranol® 360 in addition one aromatic polyester polyol (Terol® 352) in the ratios illustrated in Table I. Plasticizer, flame retardant, surfactants, catalysts & water were also added in the ratios illustrated in Table I to form the "B"-side cylinder. Diphenylmethane diisocyanate was used to form the "A"-side cylinder. The propellant HFC-245fa was employed for both the "A" and "B" cylinders in the quantities illustrated in Table II.

Example #2

A new formulation polyurethane foam was made by combining one polyether polyol (poly-G 37-600) with one aromatic polyester polyol (Stepanpol® PS-3524) in the ratio illustrated in Table I. The total amounts of polyols of Example #1 and Example #2 were adjusted to be equal. Plasticizer, flame retardant, surfactants, catalysts & water were also added in the ratios illustrated in Table I to form the "B"-side cylinder. Diphenylmethane diisocyanate was used to form the "A"-side cylinder. The propellant HFC-245fa was employed for both the "A" and "B" cylinders in the quantities illustrated in Table II.

Example #3

A new formulation polyurethane foam was made by combining one polyether polyol (poly-G 37-600) with one aromatic polyester polyol (Stepanpol® PS-3524) in the ratio illustrated in Table I. The total amounts of polyols of Example #1, #2 and #3 were adjusted to be equal. Plasticizer, flame retardant, surfactants, catalysts & water were also added in the ratios illustrated in Table I to form the "B"-side cylinder. Diphenylmethane diisocyanate was used to form the "A"-side cylinder. The propellant FEA-1100 was employed for both the "A" and "B" cylinders in the quantities illustrated in Table II noting that the catalyst package was different due to the internal olefin propellant used in the formulation, which also requires essentially the absence of water due at least in part to the reactivity of the internal olefinic bond of the propellant or synonymously blowing agent.

TABLE I

| Component | Formula | Ex. #1 (wt. %) | Ex. #2 (wt. %) | Ex. #2 Range (wt. %) | Ex. #3 (wt. %) | Ex. #3 Range (wt. %) |
|---|---|---|---|---|---|---|
| Polyether polyol | 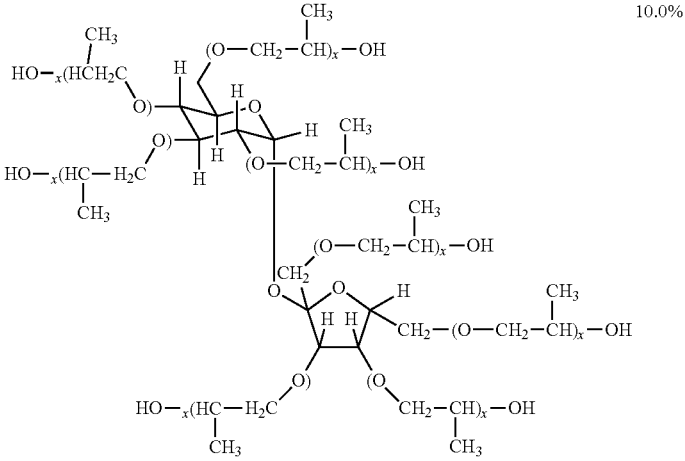 | 34.2% | 34.2% | 25-45% | 36.4% | 25-45% |
| Polyether polyol | 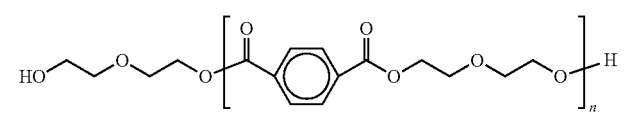 | 10.0% | | | | |
| Polyester polyol | 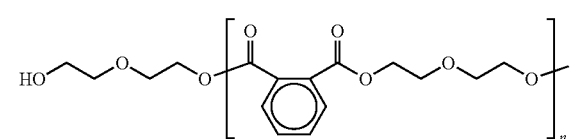 | 9.6% | | | | |
| Polyester polyol | 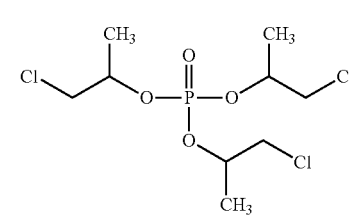 | | 19.6% | 10-30% | 19.6% | 10-30% |
| Additive | 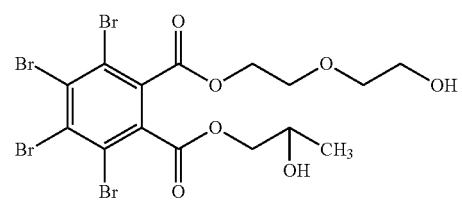 [SMILES: CC(O)COC(=O)c1c(Br)c(Br)c(Br)c(Br)c1C(=O)OCCOCCO] | 30.0% | 30.0% | 24-25% | 30.0% | 25-45% |
| Additive | | 10.0% | 10.0% | 5-20% | 10.0% | 5-20% |

TABLE I-continued

| Component | Formula | Ex. #1 (wt. %) | Ex. #2 (wt. %) | Ex. #2 Range (wt. %) | Ex. #3 (wt. %) | Ex. #3 Range (wt. %) |
|---|---|---|---|---|---|---|
| Surfactant | B 8499 Tegostab ® proprietary polyether polydimethylsiloxane copolymer foam stabilizer | 1.5% | 1.5% | 1-5% | 1.5% | 1-5% |
| Surfactant | LK 443 Dabco ® propietary non-silicone containing organic surfactant having a viscosity at 25° C. of 2600 cps, 20% sol. in water, and an average OH# of 36 containing 0.1-1% N-vinyl-2-pyrrolidone | 1.5% | 1.5% | 1-5% | 1.5% | 1-5% |
| Catalyst | (pentamethyldiethylenetriamine structure) | 0.5% | 0.5% | 1-5% | | |
| Catalyst | (potassium 2-ethylhexanoate structure) | 1.7% | 1.7% | 1-5% | 0.8% | 0.5-2% |
| Catalyst | (bis(2-morpholinoethyl) ether structure) | | | | 0.1% | 0.01-1% |
| Catalyst | (dibutyltin bis(dodecylthiolate) structure) | | | | 0.1% | 0.01-1% |
| Other | Water | 1.0% | 1.0% | 0.5-3% | | |
| | Totals | 100% | 100% | 100% | 100% | 100% |

Formulations of Example #1 and Example #2 were made using the hydrofluorocarbon ("HFC") high boiling point propellant 1,1,1,3,3-pentafluoropropane (HFC-245fa) while Example #3 was made using the hydrofluoroolefin ("HFO") internal olefin propellant 1,1,1,4,4,4 hexafluoro-2-butene (FEA-1100) as illustrated in Table II.

TABLE II

| Composition | Example #1 | Example #2 | Example #3 |
|---|---|---|---|
| "A-side" | | | |
| MDI | 94% | 94% | 94% |
| HFC-245fa propellant | 6% | 6% | |
| FEA-1100 propellant | | | 6% |
| "B"-side | | | |
| "B"-side blend of Table I | 89% | 89% | 89% |
| HFC-245fa propellant | 11% | 11% | |
| FEA-1100 propellant | | | 11% |

The examples above had the following physical characteristics.

TABLE III

| | Initial | 3 mo. | 6 mo. | 9 mo. | 12 mo. |
|---|---|---|---|---|---|
| Example #1 | | | | | |
| A/B ratio | 1.40 | 1.20 | 1.40 | 1.38 | 1.29 |
| Gel (sec) | 39 | 64 | 71 | 82 | 92 |
| Tack (sec) | 75 | 112 | 127 | 170 | 192 |
| ρ (lbs/ft³) | 2.18 | 2.29 | 2.14 | 2.40 | 2.58 |
| CDR | 1.00 | 1.64 | 1.82 | 2.10 | 2.36 |
| R-value (° F.*hr*ft²/BTU*in) | 6.59 | 6.92 | 5.84 | 4.92 | 5.13 |
| % CCC | 90.49 | 85.04 | 89.92 | 90.00 | 74.84 |
| II comp. (psi) | 26.27 | 22.00 | 32.55 | 29.34 | 29.08 |
| Example #2 | | | | | |
| A/B ratio | 1.24 | 1.19 | 0.92 | 1.21 | 1.25 |
| Gel (sec) | 33 | 44 | 59 | 88 | 85 |
| Tack (sec) | 61 | 77 | 101 | 139 | 237 |
| ρ (lbs/ft³) | 1.90 | 2.03 | 2.20 | 2.22 | 2.39 |
| CDR | 1.00 | 1.33 | 1.79 | 2.67 | 2.58 |
| R-value (° F.*hr*ft²/BTU*in) | 7.11 | NR | 7.30 | 5.65 | 5.20 |
| % CCC | 85.99 | NR | NR | 92.22 | 81.25 |
| II comp. (psi) | 22.17 | NR | 22.06 | 27.55 | 29.93 |
| Example #3 | | | | | |
| A/B ratio | 1.01 | 1.10 | 0.97 | 1.20 | 1.11 |
| Gel (sec) | 35 | 41 | 56 | 48 | 28 |
| Tack (sec) | 43 | 67 | 94 | 74 | 47 |
| ρ (lbs/ft³) | 3.04 | 2.98 | 3.52 | 3.67 | 3.51 |
| CDR | 1.00 | 1.19 | 1.60 | 1.37 | 0.80 |
| R-value (° F.*hr*ft²/BTU*in) | 7.12 | 6.38 | 6.32 | 6.62 | 7.14 |
| % CCC | 93.57 | 95.15 | 91.21 | 82.23 | 91.24 |
| II comp. (psi) | 35.85 | 38.93 | 50.03 | 46.99 | NR |

One important test for flotation purposes, is the ability of any synthesized foam to pass the U.S. Coast Guard Title 33, Part 183 test, which employs a series of ASTM standards, namely ASTM D471 & ASTM D2842. The results of the testing for Example #1, Example #2 and Example #3 are illustrated in Table IV and the adjacent P/F columns are a shorthand notation as to whether the composition passed or failed the identified testing protocol.

TABLE IV

| Test | Requirements | Ex. #1 | P/F | Ex. #2 | P/F | Ex. #3 | P/F |
|---|---|---|---|---|---|---|---|
| Effects of Fluids 24 hrs. @ 23° C. Reference Fuel "B" | −5% max | | | 0.0% | P | 0.0% | P |
| Effects of Fluids 30 days @ 23° C. Reference Fuel "B" | −5% max | | | +1.9% | P | 0.0% | P |
| Effects of Fluids 24 hrs. @ 23° C. IRM 902 Oil | −5% max | 0.0% | P | 0.0% | P | 0.0% | P |
| Effects of Fluids 30 days @ 23° C. IRM 902 Oil | −5% max | −2.0% | P | +1.9% | P | −2.0% | P |
| Effects of Fluids 24 hrs. @ 23° C. 5% $Na_3PO_4$ | −5% max | 0.0% | P | 0.0% | P | 0.0% | P |
| Effects of Fluids 30 days @ 23° C. 5% $Na_3PO_4$ | −5% max | −2.0% | P | +3.8% | P | −2.0% | P |
| Effects of Fluids 30 Days at 38° C. gasoline vapor | −5% max | −13.7% | F | +5.0% | P | +5.0% | P |

As illustrated above, Title 33: Navigation and Navigable Waters has several stringent requirements, as illustrated in Chapter I: Coast Guard, Department of Homeland Security, Subchapter S: Boating Safety, Part 183: Boats and Associated Equipment, Subpart F: Flotation Requirements for Inboard Boats, Inboard/Outdrive Boats, and Airboats.

§183.114—Test of Flotation Materials.
(a) Vapor test. The flotation material must not reduce in buoyant force more than 5% after being immersed in a fully saturated gasoline vapor atmosphere for 30 days at a minimum temperature of 38° C.
(b) 24-hour gasoline test. The flotation material must not reduce in buoyant force more than 5% after being immersed for 24 hours at 23° C. plus or minus 2° C. in reference fuel B, of ASTM D 471 (incorporated by reference, see §183.5).
(c) 30-day gasoline test. The flotation material must not reduce in buoyant force more than 5% after being immersed for 30 days at 23° C. plus or minus 2° C. in reference fuel B, of ASTM D 471 (incorporated by reference, see §183.5).
(d) 24-hour oil test. The flotation material must not reduce in buoyant force more than 5% after being immersed for 24 hours at 23° C. plus or minus 2° C. in reference oil No. 2, of ASTM D 471 (incorporated by reference, see §183.5).
(e) 30-day oil test. The flotation material must not reduce in buoyant force more than 5% after being immersed for 30 days at 23° C. plus or minus 2° C. in reference oil No. 2, of ASTM D 471 (incorporated by reference, see §183.5).
(f) 24-hour bilge cleaner test. The flotation material must not reduce in buoyant force more than 5% after being immersed for 24 hours at 23° C. plus or minus 2° C. in a 5% solution of trisodium phosphate in water.
(q) 30-day bilge cleaner test. The flotation material must not reduce in buoyant force more than 5% after being immersed for 30 days at 23° C. plus or minus 2° C. in a 5% solution of trisodium phosphate in water.
(h) The buoyant force reduction in paragraphs (a) through (g) of this section is measured in accordance with ASTM D 2842 (incorporated by reference, see §183.5).

§183.114 Flotation Performance Tests

| Test 183.114 | Area 183.110 | Engine room bilge | Engine room (unless open to atmosphere) |
|---|---|---|---|
| (a) Vapor test | | X | |
| (b) 24 hour gasoline test | | | X |
| (c) 30 day gasoline test | X | | |
| (d) 24 hour oil test | | | X |
| (e) 30 day oil test | X | | |
| (f) 24 hour bilge cleaner test | | | X |
| (g) 30 day bilge cleaner test | X | | |

What is illustrated above is that by switching to a higher percentage of aromatic ortho-substituted polyester polyols (i.e., phthalic anhydride based in comparison to terephthalic anhydride based) in the foam composition for the "B"-side in combination with the reduction and/or removal of a large amount (preferably totally) of a sucrose glycerine polyether polyol (illustrated by the above Example #2 & Example #3), the foam became clearly less subject to degradation by various solvents which would commonly be encountered by foams in a marine environment as compared and contrasted to Example #1. What is surprising is that increasing the amount of ortho-substitution in the aromatic polyester polyol (phthalic anhydride based) on the phthalic acid ring resulted in a much more stable composition compared to para-substitution (terephthalic anhydride based).

It is also evident that by changing the propellant from a HFC (hydrofluorocarbon) to an HFO (hydrofluoroolefin) required some changes in the catalyst package in addition to essentially the complete removal of water from the formulation in order to protect the internal double bond from prematurely being attacked in the pressurized container.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A two component polyurethane or polyisocyanurate foam blown by at least one hydrofluorocarbon blowing agent having a boiling point at atmospheric pressure of between ~5° C. to ~50° C. and miscible blends thereof, which passes all United States Coast Guard Title 33, Part 183 specifications wherein the buoyant force of the foam is not reduced more than 5% after exposure to all of the conditions identified in the United States Coast Guard Title 33, Part 183 specifications, namely:

the two component polyurethane foam synthesized from two sets of pressurized reactant components which comprise an A-side and a B-side:
the B-side reactant components comprising a polyol blend:
25-45 wt. % of at least one polyether polyol in the polyol blend present in a major amount;
10-30 wt. % of at least one phthalic anhydride based aromatic polyester polyol present in a minor amount in the polyol blend, the at least one phthalic anhydride based aromatic polyester polyol comprising at least 35% of the polyol blend;

30-65 wt. % of at least one other additive selected from the group comprising at least one flame retardant and at least one plasticizer;
1-5 wt. % of at least one surfactant;
1-5 wt. % of at least one catalyst;
0.5-3 wt. % of water;
the at least one hydrofluorocarbon blowing agent having a boiling point at atmospheric pressure of between ~5° C. to ~50° C. and miscible blends thereof; and
the weight percentages of all of the B-side reactant components combining to total 100%;
the A-side reactive components comprising:
a poly- or diisocyanate; and
the at least one hydrofluorocarbon blowing agent having a boiling point at atmospheric pressure of between ~5° C. to ~50° C. and miscible blends thereof.

2. The polyurethane foam of claim 1 wherein the at least one phthalic anhydride based aromatic polyester is

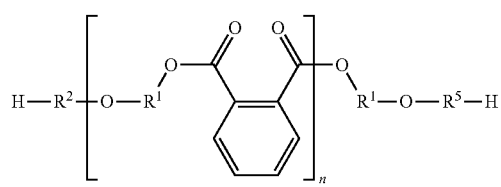

wherein
$R^1$ is selected from the group consisting of an alkylene group of from 2 to 10 carbon atoms, $-CH_2-R^3-CH_2-$, and $-(R^4O)_m-R^4-$;
$R^2$ and $R^5$ are independently $-[CH_2CH_2O]_x-$, $[CH_2CH(CH_3)O]_x-$, $-[CH_2CH_2CH(CH_3)O]_x-$, or a random combination thereof;
$R^3$ is selected from the group consisting of

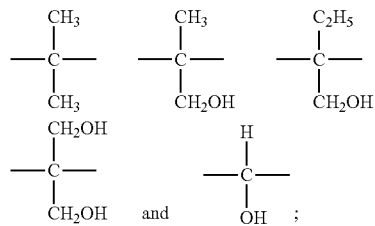

each $R^4$ is independently an alkylene group of from 2 to 4 carbon atoms; and
x, m, and n are independently from 1-200.

3. The polyurethane foam of claim 2 wherein the at least one phthalic anhydride based aromatic polyester polyol is

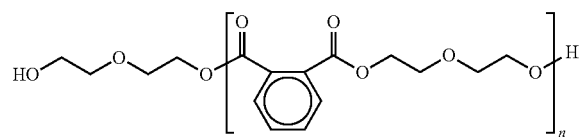

and further wherein
an hydroxyl number in mg KOH/g is between 230-250 inclusive;
a viscosity value at 25° C. is between 2,000-4,500 cP inclusive;
an equivalent average weight is approximately 234; and
an average molecular weight is approximately 468.

4. The polyurethane foam of claim 2 wherein the at least one polyether polyol is

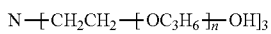

and further wherein
an hydroxyl number in mg KOH/g is approximately 600;
a viscosity value at 25° C. is approximately 380 cP; and
an average molecular weight is approximately 280.

5. The polyurethane foam of claim 4 wherein the at least one other additive is selected from the group comprising

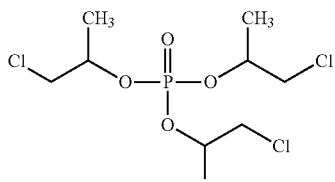

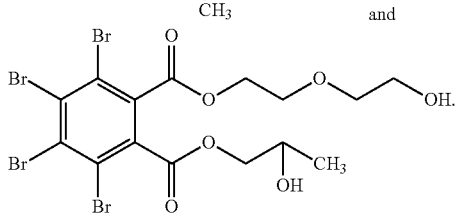

6. The polyurethane foam of claim 5 wherein the at least one catalyst is at least two catalysts selected from the group comprising

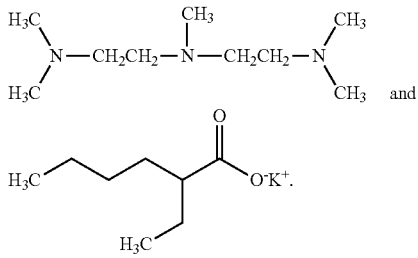

7. The polyurethane foam of claim 6 wherein the water is added in an amount of approximately 1% by weight.

8. The polyurethane foam of claim 7 wherein the at least one blowing agent has a boiling point at atmospheric pressure of between ~10° C. to ~40° C.

9. The polyurethane foam of claim 8 wherein the at least one blowing agent is 1,1,1,3,3-pentafluoropropane.

10. A process of synthesizing a two-component polyurethane or polyisocyanurate foam blown by at least one hydrofluorocarbon blowing agent having a boiling point at atmospheric pressure of between ~5° C. to ~50° C., and miscible blends thereof, which passes all United States Coast Guard Title 33, Part 183 specifications wherein the buoyant force of the foam is not reduced more than 5% after testing pursuant to the United States Coast Guard Title 33, Part 183 specifications:
  the two-component polyurethane foam synthesized from two sets of pressurized reactant components which comprise an A-side and a B-side:
    the B-side reactant components comprising a polyol blend:
      25-45 wt. % of at least one polyether polyol in the polyol blend present in a major amount;
      10-30 wt. % of at least one phthalic anhydride based aromatic polyester polyol present in a minor amount in the polyol blend;
      30-65 wt. % of at least one other additive selected from the group comprising at least one flame retardant and at least one plasticizer;
      1-5 wt. % of at least one surfactant;
      1-5 wt. % of at least one catalyst;
      0.5-3 wt. % of water;
      the at least one hydrofluorocarbon blowing agent having a boiling point at atmospheric pressure of between ~5° C. to ~50° C. and miscible blends thereof; and
      the weight percentages of all of the B-side reactant components combining to total 100%;
    the A-side reactive components comprising:
      a poly- or diisocyanate; and
      the at least one hydrofluorocarbon blowing agent having a boiling point at atmospheric pressure of between ~5° C. to ~50° C. and miscible blends thereof,
  the process comprising the step of adding at least one phthalic anhydride based aromatic polyester polyol comprising at least 35% of the polyol blend, the ortho substitution on the phenyl ring providing additional thermal, hydrolytic and chemical stability to a polyurethane without the added amount of the at least one phthalic anhydride based aromatic polyester polyol.

11. The process of claim 10 wherein
The at least one phthalic anhydride based aromatic polyester polyol is

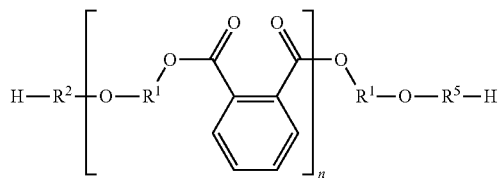

wherein
$R^1$ is selected from the group consisting of an alkylene group of from 2 to 10 carbon atoms, —$CH_2$—$R^3$—$CH_2$—, and —$(R^4O)_m$—$R^4$—;
$R^2$ and $R^5$ are independently —$[CH_2CH_2O]_x$—, $[CH_2CH(CH_3)O]_x$—, —$[CH_2CH_2CH(CH_3)O]_x$—, or a random combination thereof;
$R^3$ is selected from the group consisting of

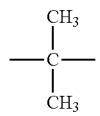 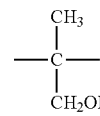 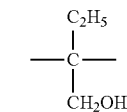

-continued

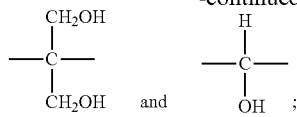

each $R^4$ is independently an alkylene group of from 2 to 4 carbon atoms; and
x, m, and n are independently from 1-200.

12. The process of claim 11 wherein
the at least one phthalic anhydride based aromatic polyester polyol is

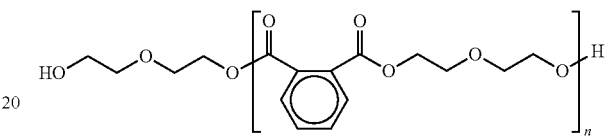

and further wherein
  an hydroxyl number in mg KOH/g is between 230-250 inclusive;
  a viscosity value at 25° C. is between 2,000-4,500 cP inclusive;
  an equivalent average weight is approximately 234; and
  an average molecular weight is approximately 468.

13. The process of claim 11 wherein
the at least one polyether polyol is

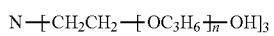

and further wherein
  an hydroxyl number in mg KOH/g is approximately 600;
  a viscosity value at 25° C. is approximately 380 cP; and
  an average molecular weight is approximately 280.

14. The process of claim 13 wherein
the at least one other additive is selected from the group comprising

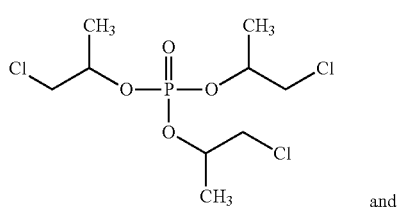

and

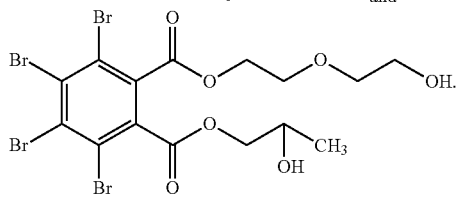

15. The polyurethane foam of claim 14 wherein
the at least one catalyst is at least two catalysts selected from the group comprising

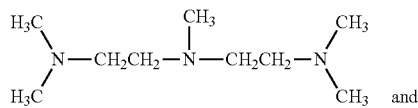

and

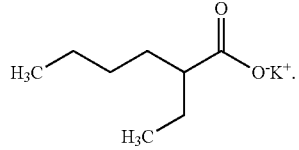

16. The process of claim 15 wherein
the water is added in an amount of approximately 1% by weight.
17. The process of claim 16 wherein
the at least one blowing agent has a boiling point at atmospheric pressure of between ~10° C. to ~40° C.
18. The process of claim 17 wherein
the at least one blowing agent is 1,1,1,3,3-pentafluoropropane.
19. A two-component polyurethane or polyisocyanurate foam blown by at least one hydrofluoroolefin blowing agent having a boiling point at atmospheric pressure of between ~5° C. to ~50° C. and miscible blends thereof, which passes all United States Coast Guard Title 33, Part 183 specifications wherein the buoyant force of the foam is not reduced more than 5% after testing pursuant to the United States Coast Guard Title 33, Part 183 specifications:
the two-component polyurethane foam synthesized from two sets of pressurized reactant components which comprises an A-side and a B-side:
the B-side reactant components comprising a polyol blend:
25-45 wt. % of at least one polyether polyol in the polyol blend present in a major amount;
10-30 wt. % of at least one phthalic anhydride based aromatic polyester polyol present in a minor amount in the polyol blend, the at least one phthalic anhydride based aromatic polyester polyol comprising at least 35% of the polyol blend;
30-65 wt. % of at least one other additive selected from the group comprising at least one flame retardant and at least one plasticizer;
1-5 wt. % of at least one surfactant;
1-5 wt. % of at least two catalysts, one of which is a tin-based catalyst;
essentially no water;
the least one hydrofluoroolefin blowing agent having a boiling point at atmospheric pressure of between ~5° C. to ~50° C. and miscible blends thereof; and
the weight percentages of all of the B-side reactant components combining to total 100%;
the A-side reactive components comprising:
a poly- or diisocyanate; and
the least one hydrofluoroolefin blowing agent having a boiling point at atmospheric pressure of between ~5° C. to ~50° C. and miscible blends thereof.
20. The polyurethane foam of claim 19 wherein
the at least one phthalic anhydride based aromatic polyester polyol is

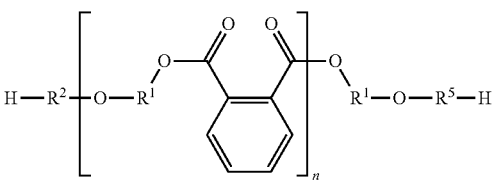

wherein
$R^1$ is selected from the group consisting of an alkylene group of from 2 to 10 carbon atoms, $-CH_2-R^3-CH_2-$, and $-(R^4O)_m-R^4-$;
$R^2$ and $R^5$ are independently $-[CH_2CH_2O]_x-$, $[CH_2CH(CH_3)O]_x-$, $-[CH_2CH_2CH(CH_3)O]_x-$, or a random combination thereof;
$R^3$ is selected from the group consisting of

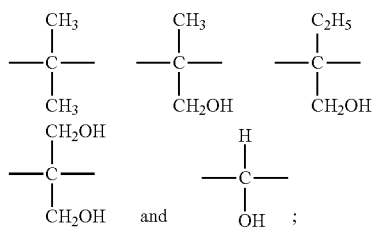

each $R^4$ is independently an alkylene group of from 2 to 4 carbon atoms; and
x, m, and n are independently from 1-200.
21. The polyurethane foam of claim 20 wherein
the at least one phthalic anhydride based aromatic polyester polyol is

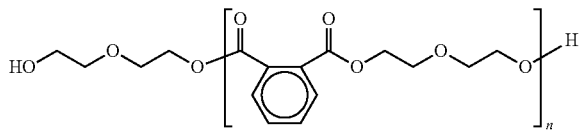

and further wherein
an hydroxyl number in mg KOH/g is between 230-250 inclusive;
a viscosity value at 25° C. is between 2,000-4,500 cP inclusive;
an equivalent average weight is approximately 234; and
an average molecular weight is approximately 468.
22. The polyurethane foam of claim 20 wherein
the at least one polyether polyol is

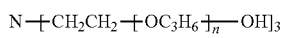

and further wherein
an hydroxyl number in mg KOH/g is approximately 600;
a viscosity value at 25° C. is approximately 380 cP; and
an average molecular weight is approximately 280.
23. The polyurethane foam of claim 22 wherein
the at least one other additive is selected from the group comprising

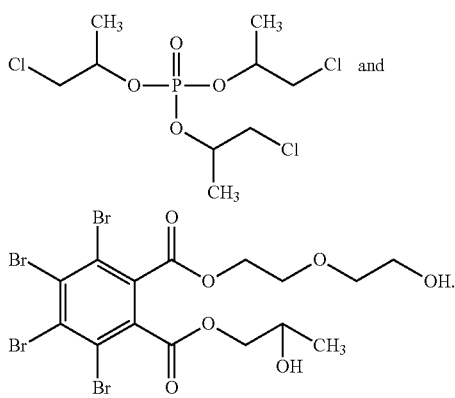

24. The polyurethane foam of claim 23 wherein the at least two catalysts comprise

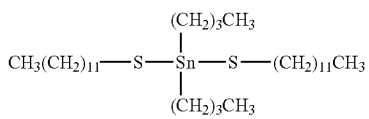

and at least one of

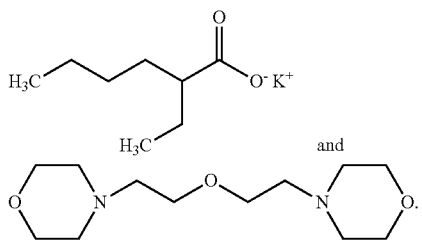

25. The polyurethane foam of claim 24 wherein the at least one blowing agent has a boiling point at atmospheric pressure of between ~10° C. to ~40° C.

26. The polyurethane foam of claim 25 wherein the at least one blowing agent is 1,1,1,4,4,4 hexafluoro-2-butene.

27. A process of synthesizing a two-component polyurethane or polyisocyanurate foam blown by at least one hydrofluoroolefin blowing agent having a boiling point at atmospheric pressure of between ~5° C. to ~50° C., and miscible blends thereof, which passes all United States Coast Guard Title 33, Part 183 specifications wherein the buoyant force of the foam is not reduced more than 5% after testing pursuant to the United States Coast Guard Title 33, Part 183 specifications:

the two-component polyurethane foam synthesized from two sets of pressurized reactant components which comprises an A-side and a B-side:

the B-side reactant components comprising a polyol blend:
25-45 wt. % of at least one polyether polyol in the polyol blend present in a major amount;
10-30 wt. % of at least one phthalic anhydride based aromatic polyester polyol present in a minor amount in the polyol blend;
25-45 wt. % of at least one plasticizer;
30-65 wt. % of at least one other additive selected from the group comprising at least one flame retardant and at least one plasticizer;
1-5 wt. % of at least two catalysts, one of which is a tin-based catalyst;
no added water;
the at least one hydrofluoroolefin blowing agent having a boiling point at atmospheric pressure of between ~5° C. to ~50° C., and miscible blends thereof; and
the weight percentages of all of the B-side reactant components combining to total 100%;

the A-side reactive components comprising:
a poly- or diisocyanate; and
the at least one hydrofluoroolefin blowing agent having a boiling point at atmospheric pressure of between ~5° C. to ~50° C., and miscible blends thereof, the process comprising the step of adding at least one phthalic anhydride based aromatic polyester polyol comprising at least 35% of the polyol blend, the ortho substitution on the phenyl ring providing additional thermal, hydrolytic and chemical stability to a polyurethane without the added amount of the at least one phthalic anhydride based aromatic polyester polyol.

28. The process of claim 27 wherein
the at least one phthalic anhydride based aromatic polyester polyol is

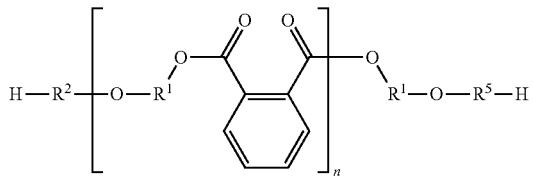

wherein
$R^1$ is selected from the group consisting of an alkylene group of from 2 to 10 carbon atoms, —$CH_2$—$R^3$—$CH_2$—, and —$(R^4O)_m$—$R^4$—;
$R^2$ and $R^5$ are independently —$[CH_2CH_2O]_x$—, $[CH_2CH(CH_3)O]_x$—, —$[CH_2CH_2CH(CH_3)O]_x$—, or a random combination thereof;
$R^3$ is selected from the group consisting of

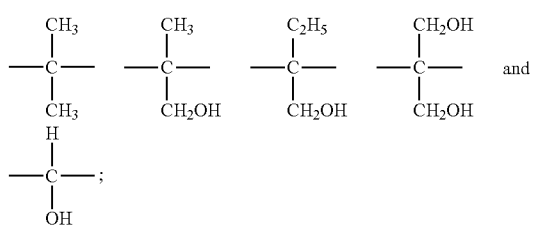

each $R^4$ is independently an alkylene group of from 2 to 4 carbon atoms; and
x, m, and n are independently from 1-200.

29. The process of claim 28 wherein
the at least one phthalic anhydride based aromatic polyester polyol is

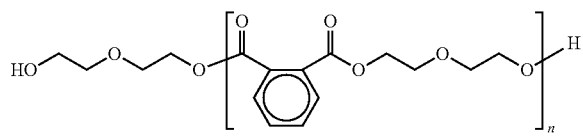

and further wherein
an hydroxyl number in mg KOH/g is between 230-250 inclusive;
a viscosity value at 25° C. is between 2,000-4,500 cP inclusive;
an equivalent average weight is approximately 234; and
an average molecular weight is approximately 468.

30. The process of claim 28 wherein the at least one polyether polyol is

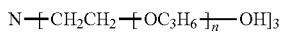

and further wherein
an hydroxyl number in mg KOH/g is approximately 600;
a viscosity value at 25° C. is approximately 380 cP; and
an average molecular weight is approximately 280.

31. The process of claim 30 wherein the at least one other additive is selected from the group comprising

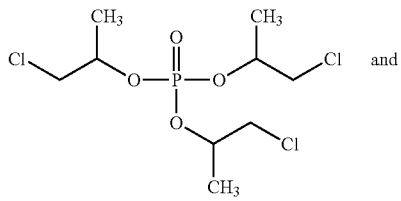 and

-continued

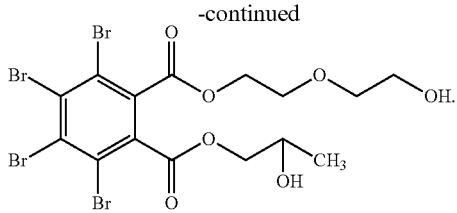

32. The process of claim 31 wherein the at least two catalysts comprise

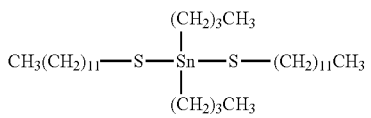

and at least one of

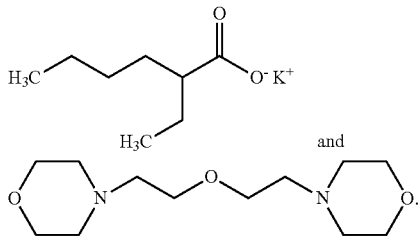

33. The process of claim 32 wherein the at least one blowing agent has a boiling point at atmospheric pressure of between ~10° C. to ~40° C.

34. The process of claim 33 wherein the at least one blowing agent is 1,1,1,4,4,4 hexafluoro-2-butene.

* * * * *